(12) United States Patent
Kanamitsu

(10) Patent No.: US 10,590,891 B2
(45) Date of Patent: Mar. 17, 2020

(54) MEMBER FOR ACTIVATING SUBSTANCE BACK GROUND

(71) Applicant: LANDMASTER JAPAN COMPANY, LIMITED, Kanagawa (JP)

(72) Inventor: Toshihisa Kanamitsu, Yokohama (JP)

(73) Assignee: LANDMASTER CO., LTD., Yokohama-Shi (JP)

( * ) Notice: Subject to any disclaimer, the term of this patent is extended or adjusted under 35 U.S.C. 154(b) by 0 days.

(21) Appl. No.: 16/099,476

(22) PCT Filed: Sep. 21, 2017

(86) PCT No.: PCT/JP2017/034025
§ 371 (c)(1),
(2) Date: Nov. 7, 2018

(87) PCT Pub. No.: WO2018/066367
PCT Pub. Date: Apr. 12, 2018

(65) Prior Publication Data
US 2019/0219007 A1    Jul. 18, 2019

(30) Foreign Application Priority Data

Oct. 4, 2016 (JP) ................. 2016-196182
Sep. 5, 2017 (JP) ................. 2017-170039

(51) Int. Cl.
*F02M 27/06* (2006.01)
*B01J 19/08* (2006.01)
*F02B 51/00* (2006.01)

(52) U.S. Cl.
CPC .......... *F02M 27/065* (2013.01); *B01J 19/081* (2013.01); *F02B 51/00* (2013.01)

(58) Field of Classification Search
CPC ..................... F02M 35/10268; F02M 27/065
See application file for complete search history.

(56) References Cited

U.S. PATENT DOCUMENTS 6,653,646 B1 * 11/2003 Shibata ................. B01J 19/081
                                                            250/497.1
2004/0238802 A1    12/2004 Inoue
                   (Continued)

FOREIGN PATENT DOCUMENTS

JP    2000-019296    1/2000
JP    2002-054514    2/2002
                (Continued)

*Primary Examiner* — Long T Tran
(74) *Attorney, Agent, or Firm* — Lex IP Meister, PLLC

(57) ABSTRACT

The present invention is to provide a device for activating a substance, which is a flexible sheet that is available regardless of the shape of each of the device that has a substance to be activated inside. The member for activating a substance 1 of the present invention is flexible. The member for activating a substance 1 includes a metal layer 11 containing a metal with a redox potential of 0 V or less or an alloy of a metal with a redox potential of 0 V or less and a radiation generating layer 12 containing a mixture of a natural ore containing a radioactive substance with a radiolucent resin. The dose of radiation generated from the radiation generating layer 12 is from 0.02 μSv/h or more to 0.2 μSv/h or less. To enhance the flexibility, a radiation shielding layer that shields radiation generated from the radiation generating layer 12 is preferably unformed.

4 Claims, 1 Drawing Sheet

(56) References Cited

U.S. PATENT DOCUMENTS

| | | | | |
|---|---|---|---|---|
| 2006/0201659 | A1* | 9/2006 | Tsuji | F28F 13/18 |
| | | | | 165/133 |
| 2008/0220203 | A1* | 9/2008 | Ichikawa | B01D 46/0036 |
| | | | | 428/116 |
| 2008/0272315 | A1 | 11/2008 | Iizuka et al. | |
| 2015/0104626 | A1* | 4/2015 | Tomita | C09D 1/00 |
| | | | | 428/213 |
| 2015/0252757 | A1* | 9/2015 | McAlister | F02M 27/042 |
| | | | | 123/297 |

FOREIGN PATENT DOCUMENTS

| | | |
|---|---|---|
| JP | 2002-055198 | 2/2002 |
| JP | 2004-346898 | 12/2004 |
| JP | 2014-174087 | 9/2014 |
| JP | 2015-168737 | 9/2015 |
| JP | 2016-037888 | 3/2016 |
| WO | 2006-077635 | 7/2006 |
| WO | 2016-031893 | 3/2016 |

\* cited by examiner

[FIG. 1]
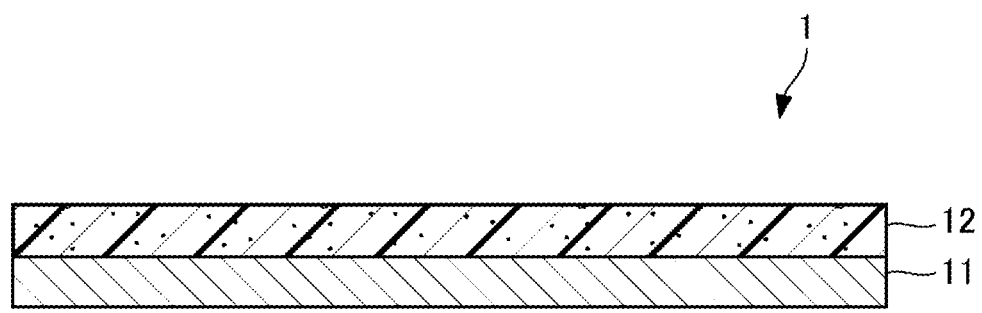
[FIG. 2]
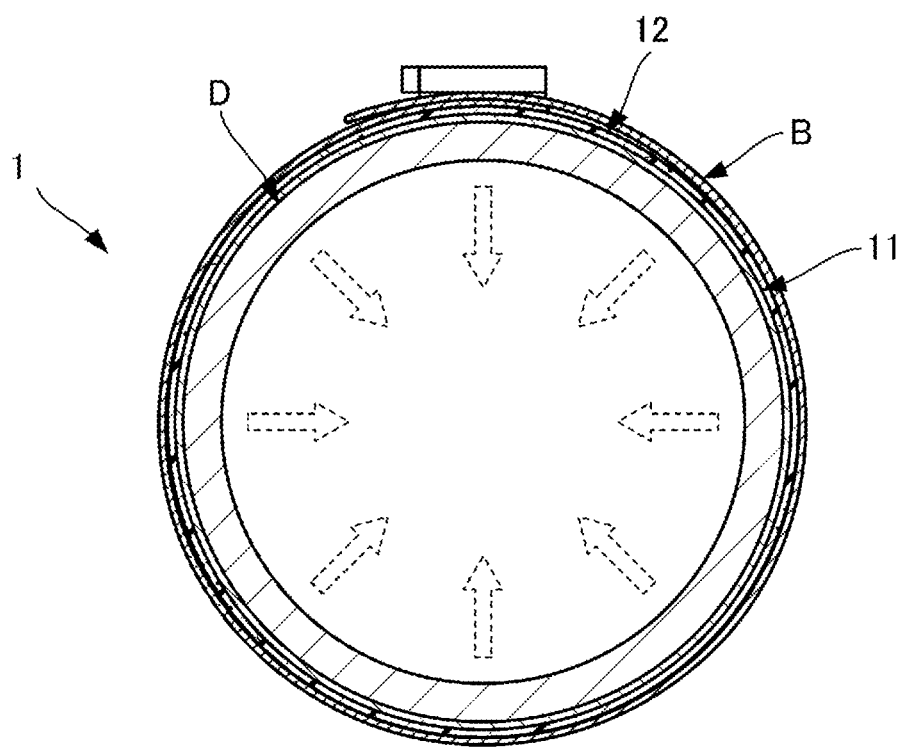

MEMBER FOR ACTIVATING SUBSTANCE

BACK GROUND

FIELD

The present invention relates to a member for activating a substance.

BACKGROUND ART

Description of the Related Art

Recently, it has been proposed that substances such as a combustion air taken in and exhaust gas emitted from an engine are activated to decrease fuel consumption in high-speed running and also reduce carbon dioxide contained in the exhaust gas.

For example, Patent Document 1 discloses a substance activation device in which a conductive metal layer is disposed between a substance to be activated and a radiation generating means that generates the radiation to be delivered to this substance. Activating combustion air to and exhaust gas from an automobile engine with this substance activation device can decrease the fuel consumption at 100 km/h in high-speed running by at most about 40% and also reduce carbon dioxide contained in the exhaust gas by at most 20%.

CITATION LIST

Patent Literature

Patent Document 1: JP 2000-019296 A

SUMMARY

However, in the substance activation device described in Patent Document 1, the dose of radiation generated from the radiation generating means is about 100 mSv/h. This requires the surface of the radiation generating layer to be provided with a radiation shielding layer that shields radiation generated from the radiation generating layer.

For example, the radiation shielding layer is a lead plate with a thickness of about 5 to 10 cm. Since the lead plate is rigid, two or more kinds of substance activation devices should be provided to conform to the shape of each of the devices that have a substance to be activated inside.

So as not to provide the radiation shielding layer, the generation of radiation should be reduced enough. However, the generation of radiation may influence the activation of substances to be activated, such as combustion air taken in and exhaust gas emitted from an engine. Thus, there is a need to activate such substances at a high level, keeping the generation of radiation low.

The generation of radiation is preferably kept low on the issues of the efficient use of mineral resources and the cost reduction to help reduce the natural ores used as the radiation generating means.

In view of these problems, an objective of the present invention is to provide a device for activating a substance, which is a flexible sheet that is available regardless of the shape of each of the devices that have a substance to be activated inside.

Since keenly examined to solve the above-mentioned problems, the inventors found that a specific material is used for the metal layer disposed between a substance to be activated and the radiation generating means to reach the above-mentioned objective and then achieved the present invention.

The present invention is a flexible member for activating a substance, including:

a metal layer containing a metal with a redox potential of 0 V or less or an alloy of a metal with a redox potential of 0 V or less; and a radiation generating layer containing a mixture of a natural ore containing a radioactive substance with a radiolucent resin, in which the dose of radiation generated from the radiation generating layer is from 0.02 μSv/h or more to 0.2 μSv/h or less.

Moreover, in the present invention, a radiation shielding layer that shields radiation generated from the radiation generating layer is preferably unformed.

According to the member for activating a substance of the present invention, the dose of radiation generated from the radiation generating layer is from 0.02 μSv/h or more to 0.2 μSv/h or less, which is several hundred-thousandth the dose of conventional members. Accordingly, it is not essential to provide a radiation shielding layer that shields radiation generated from the radiation generating layer on the outermost surface of the device. Therefore, the member for activating a substance can have flexibility, and two or more kinds of substance activation devices need not be provided to conform to the shape of each of the devices that have a substance to be activated inside.

According to the member for activating a substance of the present invention, the metal layer of the member for activating a substance can be closely attached to the surface of the device regardless of the plane or the curved surface of the device that has a substance to be activated inside. Accordingly, the metal layer and the radiation generating layer are disposed in this order on the surface of the device that has a substance to be activated inside.

The radiation generating layer contains a natural ore containing a radioactive substance and generates radiation. This radiation ionizes a substance to be activated that exists inside the device. The electrical charge caused by this ionization charges the metal contained in the metal layer and generates an electric field and a magnetic field. The electric field and the magnetic field act on a substance to be activated that exists inside the device and activate this substance.

On the contrary, the radiation generating layer of the member for activating a substance may be closely attached to the surface of the device. Accordingly, the radiation generating layer and the metal layer are disposed in this order on the surface of the device that has a substance to be activated inside.

In this case, a part of the radiation generated from the radiation generating layer is delivered directly to a substance to be activated that exists inside the device. The other part of the radiation is delivered to the metal layer, and some of this part of radiation is reflected by the metal layer at a certain incidence angle and at a certain reflection angle. If reflected at a certain incidence angle and at a certain reflection angle, the radiation is amplified. The amplified radiation passes through the radiation generating layer containing a radiolucent resin and is delivered to a substance to be activated that exists inside the device. The substance absorbs the radiation delivered directly from the radiation generating layer and the radiation amplified through the reflection from the metal layer and excites the molecules of the substance to generate free radicals by withdrawing and adding electrons. As the result, the substance is activated.

According to the member for activating a substance of the present invention, the dose of radiation generated from the radiation generating layer is from 0.02 μSv/h or more to 0.2 μSv/h or less, which is several hundred-thousandth the dose of conventional members although the radiation can sufficiently activate a substance to be activated, such as combustion air taken in and exhaust gas emitted from an engine.

Compared with conventional technologies, the member for activating a substance of the present invention can reduce mineral ores used as the radiation sources to lead to the efficient use and the cost reduction of the natural ores.

BRIEF DESCRIPTION OF DRAWINGS

FIG. 1 shows a schematic pattern diagram of the member for activating a substance 1 according to an embodiment.

FIG. 2 shows a pattern diagram of the member for activating a substance 1 used for the polymeric air duct D to an automobile engine.

DESCRIPTION OF EMBODIMENTS

Embodiments of the present invention will be specifically described below. The present invention is not limited to the following embodiments and can be appropriately modified and achieved within the scope of the objective of the present invention.

Member for Activating a Substance

FIG. 1 shows a schematic pattern diagram of the member for activating a substance 1 according to an embodiment. The member for activating a substance 1 at least includes a metal layer 11 and a radiation generating layer 12.

Metal Layer 11

The metal layer 11 contains a metal with a redox potential of 0 V or less or an alloy of a metal with a redox potential of 0 V or less. The alloy has a redox potential of 0 V or less. Since the metal layer 11 contains a specific material, the dose of radiation generated from the radiation generating layer 12 is from 0.02 μSv/h or more to 0.2 μSv/h or less, which is extremely low although the radiation can generate an electric field and a magnetic field enough to activate a substance to be activated, such as combustion air taken in and exhaust gas emitted from an engine when electrical charge is caused by the ionized substance.

Examples of the metal with a redox potential of 0 V or less include lithium (−3.045 V), cesium (−2.923 V), rubidium (−2.924 V), potassium (−2.925 V), barium (−2.92 V), strontium (−2.89 V), calcium (−2.84 V), sodium (−2.714 V), magnesium (−2.356 V), thorium (−1.90 V), beryllium (−1.85 V), aluminum (−1.676 V), titanium (−1.63 V), zirconium (−1.534 V), manganese (−1.18 V), tantalum (−0.81 V), zinc (−0.7626 V), chrome (−0.74 V), iron (−0.44 V), cadmium (−0.4025 V), cobalt (−0.277 V), nickel (−0.257 V), tin (−0.1375 V), and lead (−0.1263 V)

In order to increasingly stimulate the activation of a substance to be activated, the redox potential of the metal or the alloy contained in the metal layer 11 is preferably −0.4 V or less, more preferably −1.0 V or less, further more preferably −1.5 V or less, still further more preferably −2.0 V or less, particularly preferably −2.5 V or less.

In this embodiment, the metal layer 11 is preferably a plate or a foil. This reduces the surface area to make the metal or the alloy hard to spontaneously ignite, compared with the powder. Even if the metal or the alloy has a low redox potential, the metal layer 11 can be relatively easily handled.

Examples of the metal with a redox potential of more than 0 V include antimony (0.1504 V), bismuth (0.3172 V), copper (0.340 V), mercury (0.7960 V), silver (0.7991 V), palladium (0.915 V), iridium (1.156 V), platinum (1.188 V), and gold (1.52 V). These metals are unpreferable because the dose of radiation generated from the radiation generating layer 12 has to be adjusted to about 100 mSv/h to sufficiently activate the intended substance.

The minimum thickness of the metal layer 11 is not limited in particular as long as the radiation can generate an electric field and a magnetic field enough to activate a substance to be activated, such as combustion air taken in and exhaust gas emitted from an engine when electrical charge is caused by the ionized substance and as long as the metal layer 11 is not broken or torn if bent or wrapped around a duct, etc. The minimum thickness of the metal layer 11 is preferably 0.01 mm or more, more preferably 0.05 mm or more, further more preferably 0.1 mm or more.

The maximum thickness of the metal layer 11 is not limited in particular as long as the whole member for activating a substance 1 is flexible. The maximum thickness of the metal layer 11 is preferably 10 mm or less, more preferably 5 mm or less, particularly preferably 1 mm or more.

Radiation Generating Layer 12

The radiation generating layer 12 contains a natural ore containing a radioactive substance and a resin composition as a resin mixture.

The natural ore is not limited in particular as long as the material contains a radioactive substance. Examples of the natural ore include monazite, radium ore, phosphate ore, columbite, tantalite, strueverite, pyrochlore, bastnasite, cerium concentrate, zircon, gummite, davidite, brannerite, uraninite (pitchblende), ningyoite, autunite, carnotite, tyuyamunite, meta-tyuyamunite, tyuyamunite ore, schroeckingerite, zirkelite, xenotime, hydrothorite, auerlite, maifan stone, allanite, tungsten ore, thorianite, brookite, uranophane, torbernite, coffinite, uranothorite, uranothorianite, thorite, and francevillite.

The resin is not limited in particular. Examples of the resin include an acryl resin, a polycarbonate resin, a polyester resin, a polystyrene resin, a polyolefin resin, a vinyl chloride resin, a polyimide resin, a silicone resin, and copolymers of any combination selected from these resins. Among these, a polycarbonate resin, a polyester resin, and a silicone resin are preferable because these resins have excellent flexibility.

The minimum dose of radiation generated from the radiation generating layer 12 is 0.02 μSv/h or more, preferably 0.05 μSv/h or more, particularly preferably 0.1 μSv/h or more. When a radioactive substance contained in a natural ore generates radiation with a dose of 0.02 μSv/h or more, the radiation ionizes a substance to be activated that exists inside the device. The electrical charge caused by this ionization charges the metal contained in the metal layer 11 and generates an electric field and a magnetic field. The electric field and the magnetic field act on a substance to be activated that exists inside the device and activate this substance.

The maximum dose of radiation generated from the radiation generating layer 12 is 0.2 μSv/h or less, preferably 0.15 μSv/h or less, particularly preferably 0.1 μSv/h or less. According to the member for activating a substance 1 of this embodiment, the dose of radiation generated from the radiation generating layer 12 is 0.2 μSv/h or less, which is several hundred-thousandth the dose of conventional members although the radiation can sufficiently activate a substance to be activated, such as combustion air taken in and exhaust gas emitted from an engine.

Compared with conventional technologies, the member for activating a substance of the present invention can reduce mineral ores used as the radiation sources to lead to the efficient use and the cost reduction of the natural ores.

The dose of radiation generated from the radiation generating layer 12 is several hundred-thousandth the dose of conventional members. Accordingly, it is not essential to provide a radiation shielding layer that shields radiation generated from the radiation generating layer 12 on the outermost surface of the device. Therefore, the member for activating a substance 1 can have flexibility, and two or more kinds of substance activation devices need not be provided to conform to the shape of each of the devices that have a substance to be activated inside.

In this embodiment, the dose of radiation includes a back-ground when a NaI scintillation survey meter is used (a dose in the case where no natural ore is contained in the radiation generating layer 12).

The minimum content of a natural ore is not limited in particular as long as the natural ore can generate radiation enough to activate a substance to be activated that exists inside the device. The minimum content of a natural ore is preferably 0.01 parts by mass or more, more preferably 0.1 parts by mass or more, particularly preferably 1 part by mass or more based on 100 parts by mass of the resin composition.

The maximum content of a natural ore is not limited in particular as long as the dose of radiation generated from the radiation generating layer 12 can be adjusted to 0.2 µSv/h or less. The maximum content of a natural ore is preferably 90 parts by mass or less, more preferably 85 parts by mass or less, particularly preferably 80 parts by mass or less based on 100 parts by mass of the resin composition.

The minimum thickness of the radiation generating layer 12 is not limited in particular as long as the natural ore can generate radiation enough to activate a substance to be activated that exists inside the device. The minimum thickness of the radiation generating layer 12 is preferably 0.01 mm or more, more preferably 0.05 mm or more, particularly preferably 0.1 mm or more.

The maximum thickness of the radiation generating layer 12 is not limited in particular as long as the whole member for activating a substance 1 is flexible. The maximum thickness of the radiation generating layer 12 is preferably 10 mm or less, more preferably 5 mm or less, particularly preferably 1 mm or less.

The radiation generating layer 12 may contain a widely used additive within a scope which does not affect the invention described in this embodiment. Examples of the additive include a viscosity modifier, a processing aid, a stabilizer, a fire retardant, a disaster prevention agent, an antioxidant, an antistat, an ultraviolet absorber, a filler, a colorant, and a foaming agent Although not required, the radiation generating layer 12 contains a powder of a metal with a redox potential of from −1.5 V or more to 0 V or less or a powder of an alloy of a metal with a redox potential of from −1.5 V or more to 0 V. The alloy preferably has a redox potential of from −1.5 V or more to 0 V or less. Since such a metal or an alloy powder is contained in the radiation generating layer 12, the radiation generated from the radiation generating layer 12 collides with the metal or the alloy powder to cause diffused reflection. When the radiation is delivered to the metal layer 11, the dose of radiation reflected by the metal layer 11 at a certain incidence angle and a certain reflection angle is increased. This can lead to increased activation of the substance.

As described below, to facilitate the handling of the metal or the alloy powder when the radiation generating layer 12 is prepared, the redox potential of the metal or the alloy powder contained in the radiation generating layer 12 is preferably −1.0 V or more, more preferably −0.75 V or more, further more preferably −0.5 V or more, particularly preferably −0.4 V or more.

To stimulate the diffused reflection of the radiation generated from the radiation generating layer 12, the particle size of the metal or the alloy powder contained in the radiation generating layer 12 is preferably as small as possible. However, the smaller the particle size is, the larger the surface area of the metal or the alloy is. Thus, a measure to prevent the spontaneous ignition of the metal or the alloy is required. To facilitate the handling of the metal or the alloy powder, the radiation generating layer 12 is preferred not to contain a metal or an alloy powder with a redox potential of less than −1.5 V, more preferably less than −1.0 V, further more preferably less than −0.75 V, still further more preferably less than −0.5 V, particularly preferably less than −0.4 V.

In this embodiment, "not to substantially contain" means that the amount of the metal or the alloy powder has risks associated with the spontaneous ignition caused by the above-mentioned metal or alloy powder and with the influence on the surrounding environment including the preparation device when the resin composition is prepared.

Possibly Repeated Structure

The member for activating a substance 1 may be a structure in which the metal layer 11 and the radiation generating layer 12 are repeatedly disposed. Specifically, the member for activating a substance 1 has a repeated structure in which the metal layer 11 and the radiation generating layer 12 are repeated twice or more, for example, the metal layer 11, the radiation generating layer 12, the metal layer 11, the radiation generating layer 12, the metal layer 11, the radiation generating layer 12, and on and on.

Example Uses

Example uses of the member for activating a substance 1 according to this embodiment are described below with reference to the attached drawings. In the example uses, the attachment structure of the member for activating a substance 1 that is formed by fixing the member for activating a substance 1 in which the metal layer 11 and the radiation generating layer 12 are attached in this order to a device that has a substance to be activated inside.

First Example Use: for Air Duct D to Automobile Engine

FIG. 2 shows a pattern diagram of the member for activating a substance 1 used for the polymeric air duct D to an automobile engine.

Since the member for activating a substance 1 is flexible, the metal layer 11 of the member for activating a substance 1 can be wrapped to be closely attached to the curved surface of the air duct D. Accordingly, the metal layer 11 and the radiation generating layer 12 are disposed on the surface of the duct D in this order.

After the member for activating a substance 1 is wrapped, the hose band B only has to be wrapped around the member for activating a substance 1 to fix the member for activating a substance 1.

FIG. 2 shows that the hose band B is wrapped around the member for activating a substance 1 after the member for activating a substance 1 is wrapped. However, the present invention is not limited to this example. For example, the member for activating a substance 1 may be included in the hose band B. In this case, the hose band B is only wrapped to closely attach the metal layer 11 of the member for activating a substance 1 to the surface of the duct D so that the member for activating a substance 1 can be fixed on the air duct D.

The radiation generating layer 12 contains a natural ore containing a radioactive substance and generates radiation with a dose of from 0.02 µSv/h or more to 0.2 µSv/h or less. This radiation acts on and ionizes the intake air that flows in the duct D. The electrical charge caused by this ionization charges the metal contained in the metal layer 11 and generates an electric field and a magnetic field. The electric field and the magnetic field act on the above-mentioned intake air to considerably promote the activation of the intake air.

When the intake air activated in this way is supplied in the cylinder of an automobile engine (not shown), the fuel injected in the cylinder and the activated intake air are mixed well. Thus, the combustion efficiency of the fuel in the cylinder is considerably increased. This can promote the fuel consumption rate to decrease and to purify the exhaust gas.

Specifically, the member for activating a substance 1 of this embodiment is wrapped around the outside of the duct D to an automobile engine so that the metal layer 11 and the radiation generating layer 12 are wrapped internally and externally, respectively. Accordingly, the metal layer 11 with iron, titanium, magnesium, and lithium, and the alloy of these metals and the radiation generating layer 12 can be formed on the outside of the duct D to an automobile engine at the same time. Furthermore, since the attachment is conducted by only wrapping around the duct D, the attachment work can be done extremely easily regardless of the shape of the duct D. Furthermore, the member for activating a substance 1 attached to the outside of the duct D never causes resistance when the engine takes in air.

Second Example Use: for Exhaust Pipe of Automobile

The member for activating a substance 1 can also be used for the exhaust pipe of an automobile. Specifically, the member for activating a substance 1 is wrapped around the outside of the exhaust pipe of an automobile so that the metal layer 11 and the radiation generating layer 12 are wrapped internally and externally, respectively.

The radiation generating layer 12 contains a natural ore containing a radioactive substance and generates radiation with a dose of from 0.02 µSv/h or more to 0.2 µSv/h or less. This radiation acts on and ionizes compounds such as carbon monoxide, carbon dioxide, and nitrogen oxide contained in exhaust gas. The electrical charge caused by this ionization charges the metal contained in the metal layer 11 and generates an electric field and a magnetic field. The electric field and the magnetic field act on the above-mentioned compounds such as carbon monoxide, carbon dioxide, and nitrogen oxide to considerably promote the activation of these compounds.

These compounds ionized by the radiation and considerably activated are delivered to the catalytic device and extremely efficiently purified.

In the second example use, since the member for activating a substance 1 is wrapped around the outside of the exhaust pipe EP of an automobile, the radiation generating layer 12 is not influenced and damaged by high-temperature exhaust gas.

Although the member for activating a substance 1 is used for the exhaust pipe of an automobile in the second example use, it goes without saying that the member for activating a substance 1 can also be used for the air intake pipe of an automobile.

Third Example Use: for Cylinder Block of Automobile

The member for activating a substance 1 can also be used for the cylinder block of an automobile. Specifically, the member for activating a substance 1 is wrapped around the outside of the cylinder block of an automobile so that the metal layer 11 and the radiation generating layer 12 are wrapped internally and externally, respectively.

The radiation generating layer 12 contains a natural ore containing a radioactive substance and generates radiation with a dose of from 0.02 µSv/h or more to 0.2 µSv/h or less. This radiation acts on and ionizes the intake air to or the exhaust air from an automobile engine that flow in the cylinder block. The electrical charge caused by this ionization charges the metal contained in the metal layer 11 and generates an electric field and a magnetic field. The electric field and the magnetic field act on the above-mentioned intake air or exhaust air to considerably promote the activation of the intake air or the exhaust air.

These compounds ionized by the radiation and considerably activated are delivered to the catalytic device and extremely efficiently purified.

Fourth Example Use: for Lubricating Device

The first to the third example uses are intended to activate combustion air to and exhaust gas from an engine. However, the member for activating a substance 1 of this embodiment is not limited to the use for combustion air to and exhaust gas from an engine and can be used to activate various substances. Subsequent examples are described below.

The member for activating a substance 1 can also be used for a lubricating device that lubricates the sliding part of a machine with a lubricant.

To reduce the friction of a sliding part on which metals of the machine slides, a lubricant is used. Such a lubricant is affected by heat and worn metal powders to cause the lubrication capacity and the heat-exchange capability to gradually decrease. Moreover, if worn metal powders are accumulated on an oil filter, the penetration capability of a lubricant is decreased. This causes the lubricating performance to further decrease.

Then, the member for activating a substance 1 is wrapped around the outside of a container containing a lubricant lubricating the sliding part of a machine or a pipe in which a lubricant flows so that the metal layer 11 and the radiation generating layer 12 are wrapped internally and externally, respectively.

The radiation generating layer 12 contains a natural ore containing a radioactive substance and generates radiation with a dose of from 0.02 µSv/h or more to 0.2 µSv/h or less. This radiation acts on and ionizes the lubricant that flows in the lubricating device. The electrical charge caused by this ionization of a metal such as molybdenum charges the metal contained in the metal layer 11 and generates an electric field and a magnetic field. The electric field and the magnetic field act on the above-mentioned lubricant to considerably promote the activation of the lubricant.

Moreover, since the ionized lubricant can flow smoothly between the worn metal powders, etc., accumulated on an oil filter, the member for activating a substance 1 can not only improve the lubricating performance with maintaining the performance of the oil filter but also decrease the power loss by reducing the load to the oil pump.

Fifth Example Use: for Cooling Device

The member for activating a substance 1 can also be used for a cooling device that cools the heated part of a machine with a coolant.

For example, a coolant is pressurized and circulates in the engine, etc., to efficiently remove the heat caused by combustion from the cylinder block. However, the circulating pressurized coolant not only becomes loaded with the pump but also causes leakage from the joint such as a pipe and damage to the hose.

Then, the member for activating a substance 1 is wrapped around the outside of a container containing a coolant cooling the heated part of a machine or a pipe in which a coolant flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the coolant that flows in the cooling device. The electrical charge caused by this ionization charges the metal contained in the metal layer 11 and generates an electric field and a magnetic field. The electric field and the magnetic field act on the above-mentioned coolant to considerably promote the activation of the coolant.

As the result, a membrane can be formed on the inner wall in a coolant circulation system. The formed membrane can not only increase the heat-transfer coefficient to improve the cooling efficiency but also generate a laminar flow of coolant to flow smoothly and to decrease the circulation resistance of the coolant. As the result, the circulation pressure of the coolant can be decreased. Thus, the member for activating a substance 1 can not only reduce the load to the pump to decrease the power loss but also prevent the joint such as a pipe from leaking and avoid the hose from being damaged. Furthermore, the layer of the ionized coolant has effects to prevent the coolant circulation system from corroding and avoid a rubber hose from deteriorating.

Sixth Example Use: for Fuel Supply Device

The member for activating a substance 1 can also be used for a fuel supply device that supplies liquid or gas fuel to a combustion engine such as an engine.

In general combustion, evaporated liquid or gas fuel is combined with oxygen in the combustion chamber to take out thermal energy. To efficiently take out the energy from liquid or gas fuel, the fuel and air should be mixed well.

Then, the member for activating a substance 1 is wrapped around the outside of a container containing liquid or gas fuel supplied to a combustion engine or a pipe line in which the fuel flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the liquid fuel such as gasoline or light oil or the gas fuel such as propane gas that flows in the fuel supply device. The electrical charge caused by this ionization charges the metal contained in the metal layer 11 and generates an electric field and a magnetic field. The electric field and the magnetic field act on the above-mentioned fuel to considerably stimulate the activation of the fuel.

As the result, the particle size of the fuel injected and nebulized from the fuel injection valve can be much smaller than a usual case. Thus, fuel and air can be mixed well in the combustion chamber to take out enough thermal energy of the fuel.

Seventh Example Use: for Rotor Blades Forming Turbine

The member for activating a substance 1 can also be used for rotor blades forming a turbine.

Rotary drive force is obtained by acting water in the case of hydroelectric power generation, steam in the case of thermal electric power generation, or working fluid such as oil in the case of the automatic transmission of an automobile on the respective turbines. However, when the fluid contacts with the turbine blades, the resistance generated to the turbine blades increases as the speed of the fluid is boosted. Too much increased speed of the fluid leads to the decrease of the energy transfer capability from the fluid to the turbine blades.

Then, the member for activating a substance 1 is wrapped around the outside of a turbine blade or a casing containing a turbine blade so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the fluid that contacts with a turbine blade. The electrical charge caused by this ionization charges the metal contained in the metal layer 11 and generates an electric field and a magnetic field. The electric field and the magnetic field act on the above-mentioned fluid to considerably stimulate the activation of the fluid.

As the result, the laminar flow is formed on the surface of the rotor blades of the turbine to smoothly flow the fluid between turbine blades. Thus, the resistance generated to the turbine blades can be decreased to highly efficiently obtain the rotary driving force.

Eighth Example Use: for Cooling Device such as Air Conditioner

The member for activating a substance 1 can also be used for the cooling device such as an air conditioner.

Cooling devices such as an air conditioner and a refrigerator evaporate refrigerant in the evaporator and remove heat from air in the room or the refrigerator and then release the heat outside through the radiator by compressing the refrigerant with the condenser. To improve the cooling capability of a refrigerator or an air conditioner, the heat exchange efficiency of refrigerant in the evaporator should be improved.

Then, the member for activating a substance 1 is wrapped around an evaporator as a path for refrigerant used for a cooling device or a pipe line in which refrigerant flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the refrigerant that flows in the cooling device. The electrical charge caused by this ionization charges the metal contained in the metal layer 11 and generates an electric field and a magnetic field. The electric field and the magnetic field act on the above-mentioned refrigerant to considerably promote the activation of the fluid.

As the result, the membrane of ionized refrigerant is closely attached to the metal inner walls of the evaporator and the pipe line. Thus, the heat exchange efficiency between the metal inner walls of the evaporator and the pipe line and the refrigerant can be considerably improved.

Ninth Example Use: for Wash Water Container

The member for activating a substance 1 can also be used for a wash water container.

For general households, etc., tap water is used as a solvent for detergent that washes tableware, etc. Accordingly, warm water has to be used to improve the detergency. This has a drawback of utility costs.

Then, the member for activating a substance 1 is wrapped around a wash water container or a pipe line in which wash water flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the wash water. The electrical charge caused by this ionization charges the metal contained in the metal layer 11 and generates an electric field and a magnetic field. The electric field and the magnetic field act on the above-mentioned wash water to considerably promote the activation of the wash water.

If the ionized tap water is used as the solvent, the detergent surfactant efficiently promotes an activation effect even at a normal temperature. As the result, detergency to wash tableware, laundry, etc., can be considerably improved. Moreover, the ionized tap water has an effect to prevent the inside of the water pipe from corroding.

Tenth Example Use: for Vegetation

The member for activating a substance 1 can also be used for vegetation.

Vegetation needs water containing nutrient besides sunlight and carbon dioxide in the atmosphere. To help grow plants, the amount of water absorbed from plant roots is preferably increased.

However, in conventional technologies, the absorbed amount is only increased to some degree by increasing the temperature of water.

To increase the amount of water absorbed from plant roots from another viewpoint, the member for activating a substance 1 is wrapped around a feed-water container for water containing nutrient to be fed to plants or a pipe line in which feed water flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the feed water or the nutrient contained in the feed water. The electrical charge caused by this ionization charges the metal contained in the metal layer 11 and generates an electric field and a magnetic field. The electric field and the magnetic field act on the above-mentioned feed water or nutrient to considerably promote the activation of the feed water or nutrient.

As the result, the water fed to the plant and the nutrient contained in this water can be ionized. The water and the nutrient ionized in this way are easily absorbed from plant roots to promote vegetation. Moreover, nitrogen compounds that plants need is generated when bacteria and enzymes decompose the leaf mold. If highly activated water is fed, the decomposition of the leaf mold is promoted to increase the generation of nitrogen compounds. Accordingly, ionized water sufficiently dissolving such nitrogen compounds can considerably promote vegetation.

Eleventh Example Use: for Growth of Animals

The member for activating a substance 1 can also be used for growth of animals.

The growth of animals needs water forming the major part of their bodies. The animals cared for at zoos, etc., obtain drinking water from tap water. However, the drinking water contained in feed-water tanks is oxidized, and the deterioration proceeds.

Then, the member for activating a substance 1 is wrapped around a feed-water tank or a pipe line in which feed water flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the feed water. The electrical charge caused by this ionization charges the metal contained in the metal layer 11 and generates an electric field and a magnetic field. The electric field and the magnetic field act on the above-mentioned feed water to considerably promote the activation of the feed water.

Then, the ionized water is easily absorbed in the bodies of the animals. The ionized water also has an antioxidant action to suppress the redox potential, enhances the immune function, and has effective in the growth promotion.

Twelfth Example Use: for Growth of Underwater Lives

The member for activating a substance 1 can also be used for growth of underwater lives.

Since the environment of underwater lives is under water, the quality of water is very important. Since waste products are excreted to water in a water tank where underwater lives are cared for, the water quality deteriorates if the water is not purified.

Then, the member for activating a substance 1 is wrapped around a feed-water container containing water fed to underwater lives, a circulating purification device, or a pipe line in which feed water flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes the feed water. The electrical charge caused by this ionization charges the metal contained in the metal layer 11 and generates an electric field and a magnetic field. The electric field and the magnetic field act on the above-mentioned feed water to considerably promote the activation of the feed water.

Then, the ionized water is easily absorbed in the bodies of the underwater lives. The ionized water also has an antioxidant action to suppress the redox potential, enhances the immune function, and has effective in the growth promotion.

Thirteenth Example Use: for Septic Tank

The member for activating a substance 1 can also be used for a septic tank that treats septage.

In the septic tank that treats human waste flushed out from general households, aerobic bacteria take oxygen in the air and oxidize and degrade organic substances. Accordingly, waste can be efficiently treated by increasing such aerobic bacteria.

Then, the member for activating a substance 1 is wrapped around an air supply pump for aeration or a pipe line in which aeration air flows so that the metal layer 11 and the radiation generating layer 12 are wrapped internally and externally, respectively.

The radiation generating layer 12 contains a natural ore containing a radioactive substance and generates radiation with a dose of from 0.02 μSv/h or more to 0.2 μSv/h or less. This radiation acts on and ionizes air passing through the pump or air flowing in the pipe line. The electrical charge caused by this ionization charges the metal contained in the metal layer 11 and generates an electric field and a magnetic field. The electric field and the magnetic field act on the above-mentioned air to considerably promote the activation of the air.

As the result, the ionized air can be supplied to the septic tank. Thus, the aerobic bacteria that decompose the human waste can be activated to more highly efficiently treat human waste.

Fourteenth Example Use: For Spray Coating Device

The member for activating a substance 1 can also be used for a spray coating device.

When the body of an automobile is coated, the particle size of coating material dispersed in mist forms should be made smaller to form a more homogeneous and high-quality coating surface. However, conventional spray coating devices hardly further reduce the particle size of the dispersed coating material because of their structure that disperses coating material in mist forms by using air as is.

Then, the member for activating a substance 1 is wrapped around a compressed air supply pump used for spraying coating material in mist forms or a pipe line in which compressed air flows so that the metal layer 11 and the radiation generating layer 12 are wrapped internally and externally, respectively.

The coating material sprayed in mist forms by using ionized compressed air can promote air and coating material to mix so that the particle size of the coating material can be made much smaller. Therefore, a more homogeneous, more high-quality paintwork can be formed.

Other Example Uses

In the above-mentioned example uses, the attachment structure of the member for activating a substance 1 is formed by attaching the member for activating a substance 1 to a device that has a substance to be activated inside so that the metal layer 11 and the radiation generating layer 12 are attached in this order. However, the present invention is not limited to these example uses. In contrast to the above-mentioned example uses, specifically, the attachment structure of the member for activating a substance 1 may be formed by attaching the member for activating a substance 1 to a device that has a substance to be activated inside so that the radiation generating layer 12 and the metal layer 11 are attached in this order.

In this case, a part of the radiation generated from the radiation generating layer 12 is delivered directly to a substance to be activated that exists inside the device. The other part of the radiation is delivered to the metal layer 11, and some of this part of radiation is reflected by the metal layer 11 at a certain incidence angle and at a certain reflection angle. If reflecting at a certain incidence angle and at a certain reflection angle, the radiation is amplified. The amplified radiation passes through the radiation generating layer 12 containing a radiolucent resin and is delivered to a substance to be activated that exists inside the device. The substance absorbs the radiation delivered directly from the radiation generating layer 12 and the radiation amplified through the reflection from the metal layer 11 and excites the molecules of the substance to generate free radicals by withdrawing and adding electrons. As the result, the substance is activated.

EXAMPLES

The present invention is specifically described below with reference to Examples but is not limited thereto.

Examples and Comparative Example

Example 1

The member for activating a substance 1 shown in FIG. 1 was attached to two devices: the radiator hose and the blow-by hose. In this attachment, the metal layer 11 of the member for activating a substance 1 was wrapped to be closely attached to the surfaces of these two devices, and the metal layer 11 and the radiation generating layer 12 were disposed on the surfaces of the above-mentioned two devices in this order to obtain the attachment structure of the member for activating a substance 1. The size of the member for activating a substance 1 was 300 mm in length, 10 mm in width, and 1 mm in thickness.

Moreover, the measured dose of radiation from the attached member for activating a substance 1 was 0.05 μSv/h. The dose of radiation includes a back-ground when a NaI scintillation survey meter is used (a dose in the case where no natural ore is contained in the radiation generating layer 12).

Then, the automobile ran on Hakone turnpike under the condition of an atmospheric temperature of about 30° C. As the vehicle for the test run, CX-5 (total emission: 2.188 L) available from Mazda Motor Corporation was used.

Example 2

A test run was carried out in the same way as Example 1 except that the attachment order of the member for activating a substance 1 shown in FIG. 1 is reversed. Specifically, the radiation generating layer 12 of the member for activating a substance 1 shown in FIG. 1 was wrapped to be closely attached to the surfaces of the radiator hose and the blow-by hose, and the radiation generating layer 12 and the metal layer 11 were disposed on the surfaces of the radiator hose and the blow-by hose in this order to obtain the attachment structure of the member for activating a substance 1. Then, a test run was carried out in the same way as Example 1.

Comparative Example

A test run was carried out in the same way as Example 1 except that the member for activating a substance 1 shown in FIG. 1 was not attached to the surfaces of the above-mentioned two devices.

Evaluation 1: Fuel Cost on Uphill Road

The vehicle speed was maintained at 50 km/h, and then the gas mileage meter was reset at the 2 km post of Hakone turnpike. Then, the vehicle traveled 10 km to the 12 km post on the uphill section when the value indicated by the gas mileage meter was recorded before the vehicle slowed down. This was determined as a fuel cost measurement in an uphill road.

Evaluation 2: Fuel Cost on Downhill Road

The vehicle speed was maintained at 50 km/h, and then the gas mileage meter was reset at the 12 km post of Hakone turnpike. Then, the vehicle traveled 10 km to the 2 km post on the downhill section when the value indicated by the gas mileage meter was recorded before the vehicle slowed down. This was determined as a fuel cost measurement in a downhill road.

Table 1 shows the results.

TABLE 1

|  | Uphill road | | Downhill road | |
| --- | --- | --- | --- | --- |
|  | Fuel cost (km/L) | Improvement rate (%) | Fuel cost (km/L) | Improvement rate (%) |
| Example 1 | 7.3 | 5.8 | 99.0 | 9.9 |
| Example 2 | 7.3 | 5.8 | 99.0 | 9.9 |
| Comparative Example | 6.9 | — | 90.1 | — |

The results confirmed that the member for activating a substance 1 shown in FIG. 1 that was attached to two devices: a radiator hose and a blow-by hose had improvement in fuel cost by 5.8% on an uphill road and by 9.9% on a downhill road, compared with no member for activating a substance 1 being attached to the air duct D (Comparative Example), regardless of the order of disposing the metal layer 11 and the radiation generating layer 12 (Examples 1 and 2).

REFERENCE SIGNS LIST

1 Member for activating a substance
11 Metal layer
12 Radiation generating layer

The invention claimed is:

1. A flexible member for activating a substance, comprising:
 a metal layer containing a metal with a redox potential 0V or less or an alloy of a metal with a redox potential 0V or less having a redox potential 0V or less in a form of a plate or a foil; and
 a radiation generating layer containing a mixture of a natural ore containing a radioactive substance with a radiolucent resin and a powder of metal with a redox potential of from −1.5V or more to 0V or less or a powder of alloy of a metal with a redox potential of from −1.5V or more to 0V or less having a redox potential of from −1.5V or more to 0V or less,
 wherein the mixture does not substantially contain a powder of metal with a redox potential of less than −1.5V nor a powder of alloy of a metal with a redox potential of less than −1.5V having a redox potential of less than −1.5V, and
 wherein the dose of radiation generated from the radiation generating layer is from 0.02 μSv/h or more to 0.2 μSv/h or less.

2. A structure for activating a substance, comprising:
 a metal layer containing a metal with a redox potential 0V or less or an alloy of a metal with a redox potential 0V or less having a redox potential 0V or less in a form of a plate or a foil; and
 a radiation generating layer containing a mixture of a natural ore containing a radioactive substance with a radiolucent resin and a powder of metal with a redox potential of from −1.5V or more to 0V or less or a powder of alloy of a metal with a redox potential of from −1.5V or more to 0V or less having a redox potential of from −1.5V or more to 0V or less,
 wherein the mixture does not substantially contain a powder of metal with a redox potential of less than −1.5V nor a powder of alloy of a metal with a redox potential of less than −1.5V having a redox potential of less than −1.5V,
 wherein the dose of radiation generated from the radiation generating layer is from 0.02 μSv/h or more to 0.2 μSv/h or less, and
 wherein the metal layer and the radiation generating layer are disposed in a form of a plate or a foil.

3. A composition for forming a radiation generating layer, comprising:
 a natural ore containing a radioactive substance;
 a powder of metal with a redox potential of from −1.5V or more to 0V or less or a powder of alloy of a metal with a redox potential of from −1.5V or more to 0V or less having a redox potential of from −1.5V or more to 0V or less; and
 a radiolucent resin,
 wherein the composition does not substantially contain a powder of metal with a redox potential of less than −1.5V nor a powder of alloy of a metal with a redox potential of less than −1.5V having a redox potential of less than −1.5V, and
 wherein the dose of radiation generated from the radiation generating layer is from 0.02 μSv/h or more to 0.2 μSv/h or less.

4. A method of using the composition according to claim 3 in a structure for activating a substance, comprising:
 disposing the composition and a metal layer in a form of a plate or a foil,
 wherein the metal layer contains a metal with a redox potential 0V or less or an alloy of a metal with a redox potential 0V or less having a redox potential 0V or less.

* * * * *